Jan. 6, 1942. C. L. HUNTOON 2,268,874
SHOE PRESS
Filed Nov. 16, 1939 4 Sheets-Sheet 3

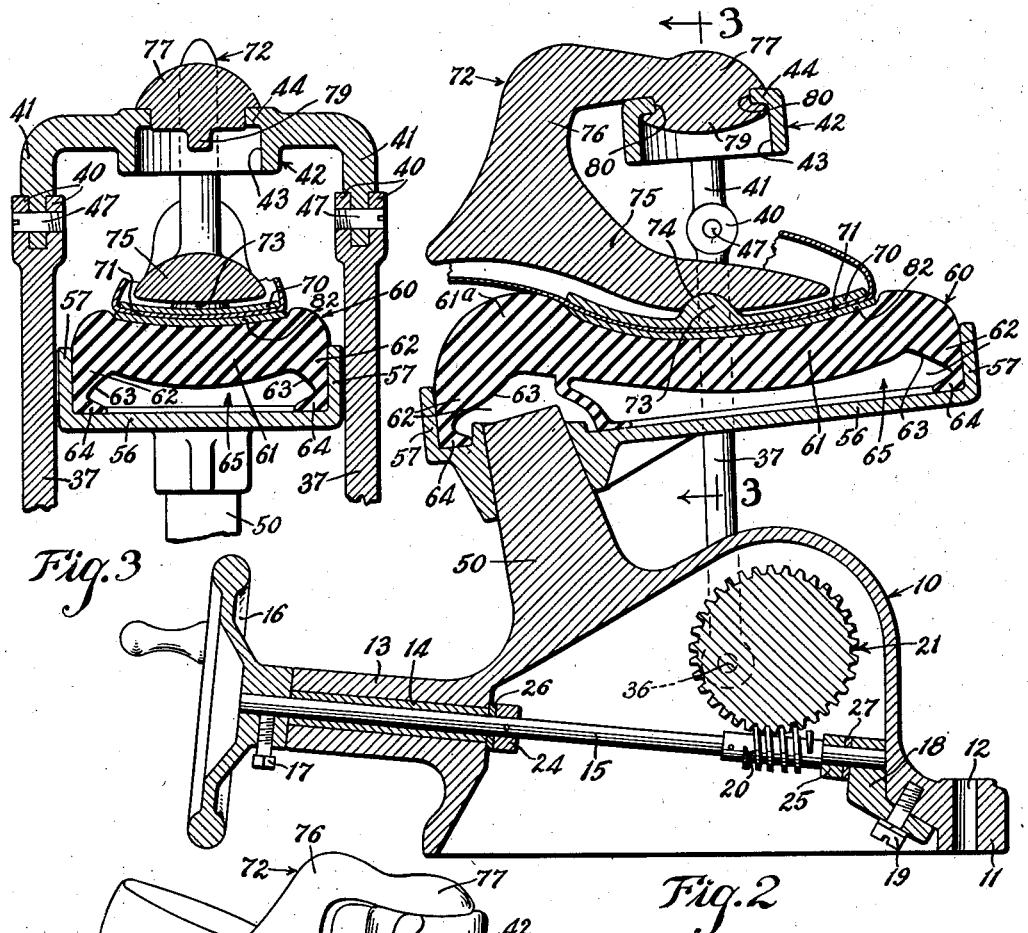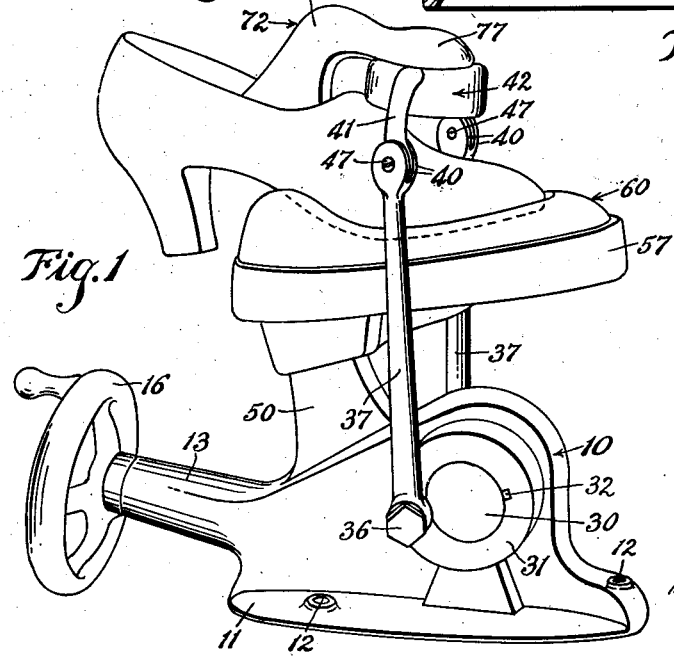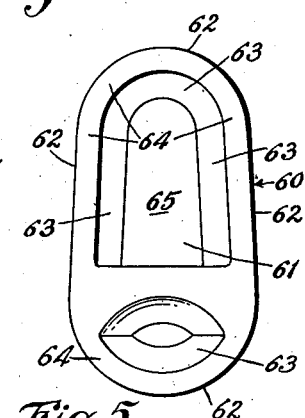

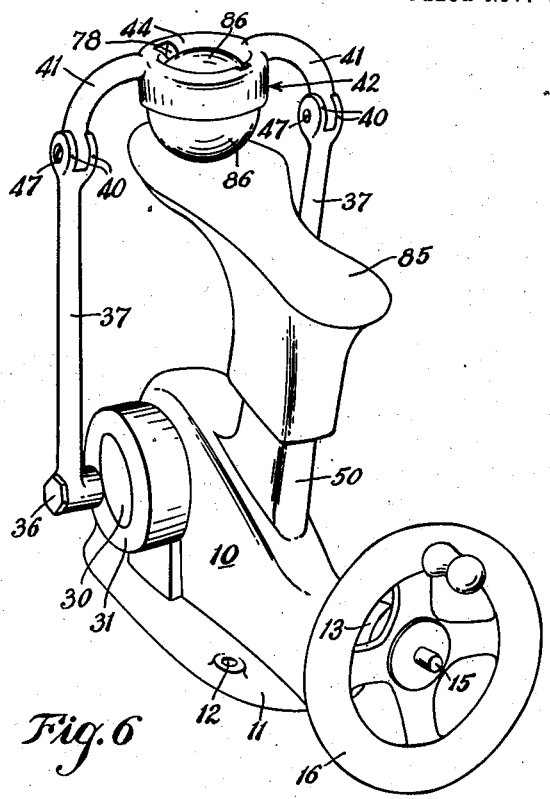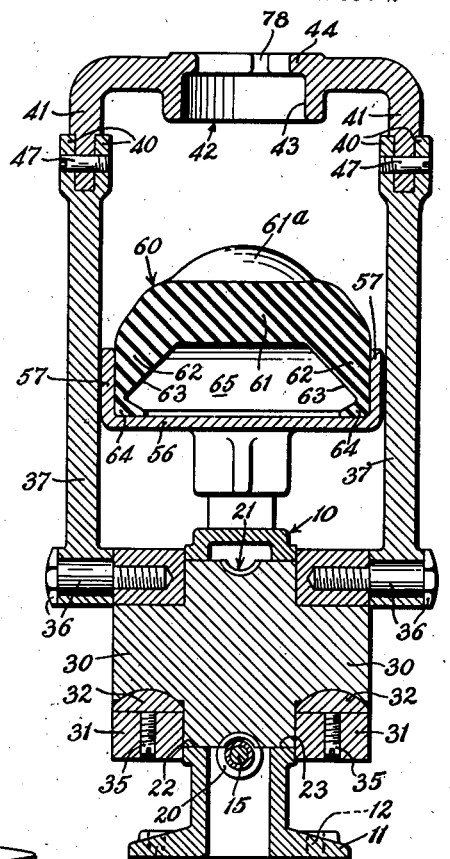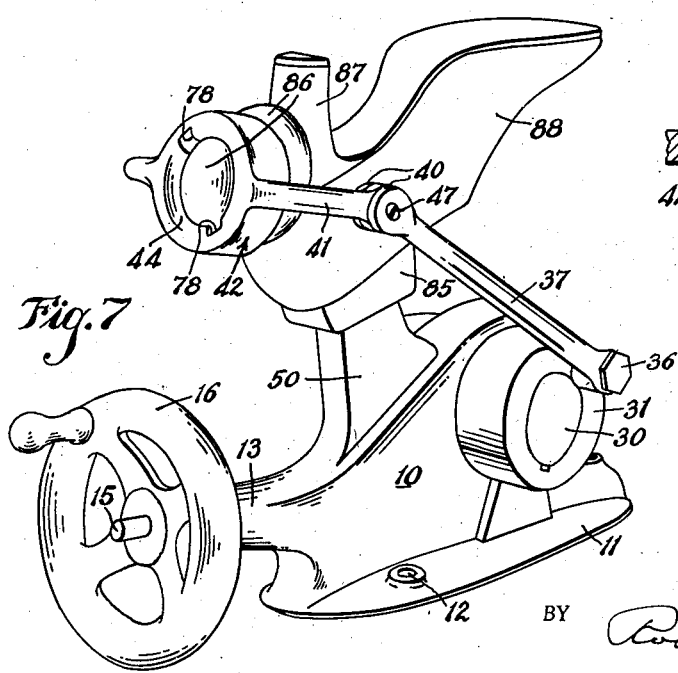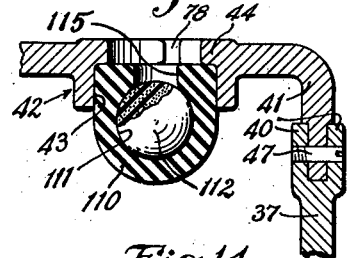

INVENTOR.
Cullen L. Huntoon
BY Rodney Bedell
ATTORNEY.

Jan. 6, 1942.  C. L. HUNTOON  2,268,874
SHOE PRESS
Filed Nov. 16, 1939  4 Sheets-Sheet 4

INVENTOR.
Cullen L. Huntoon
BY Rodney Bedell
ATTORNEY.

Patented Jan. 6, 1942

2,268,874

UNITED STATES PATENT OFFICE 2,268,874

SHOE PRESS

Cullen L. Huntoon, St. Louis, Mo., assignor to Landis Machine Company, St. Louis, Mo., a corporation of Missouri Application November 16, 1939, Serial No. 304,675

17 Claims. (Cl. 12—33)

This invention relates to the manufacture and repair of shoes, and particularly to presses for clamping shoe parts together. In some types of work, cement is applied to one or more shoe parts such, for example, as an outsole, an upper, a welt, or a patch, and the cemented parts are clamped together under pressure until the cement sets.

Sometimes inferior work results because of the inability to apply a uniform and properly directed pressure to the cemented parts, and particularly to the marginal portions. This may result in undesirable stretching of the parts or a defective bond or both. Presses now in use for cementing the soles to the uppers are constructed for that single purpose, and such presses are not readily adaptable to perform cementing operations on other parts of the shoes.

The main object of the invention is to provide in a simple mechanism means for applying a uniform and properly directed pressure to shoe elements that are to be adhesively secured together irrespective of the shoe parts involved.

Another object of the invention is to provide a shoe press in which the line of applied pressure may be changed without changing press parts, thereby providing a ready means for applying pressure to various parts of a shoe.

Another object of the invention is to provide a shoe press in which parts are easily interchangeable for accommodating different sizes of shoes and different shoe members.

These objects are attained and other objects are also attained by the structures shown in the accompanying drawings illustrating the invention in which—

Figure 1 is a perspective view of a shoe press with a shoe fitted with a last and with pressure being applied to the shoe sole.

Figure 2 is a vertical section through the structure disclosed in Figure 1, the section being taken longitudinally of the shoe.

Figure 3 is a detail vertical transverse section taken on line 3—3 in Figure 2.

Figure 4 is a vertical transverse section similar to Figure 3, but through the entire press with the shoe and last removed.

Figure 5 is a bottom view of a sole cushion forming part of the mechanism shown in Figures 1 to 4.

Figure 6 is a perspective view of the same press with shoe engaging elements differing from those illustrated in Figures 1 to 5.

Figures 7, 8 and 9 are perspective views showing a shoe on the structure of Figure 6 with pressure applied to different parts of the shoe.

Figure 14 is a fragmentary section showing a modified form of pressure device useable in connection with the press.

Figure 8:
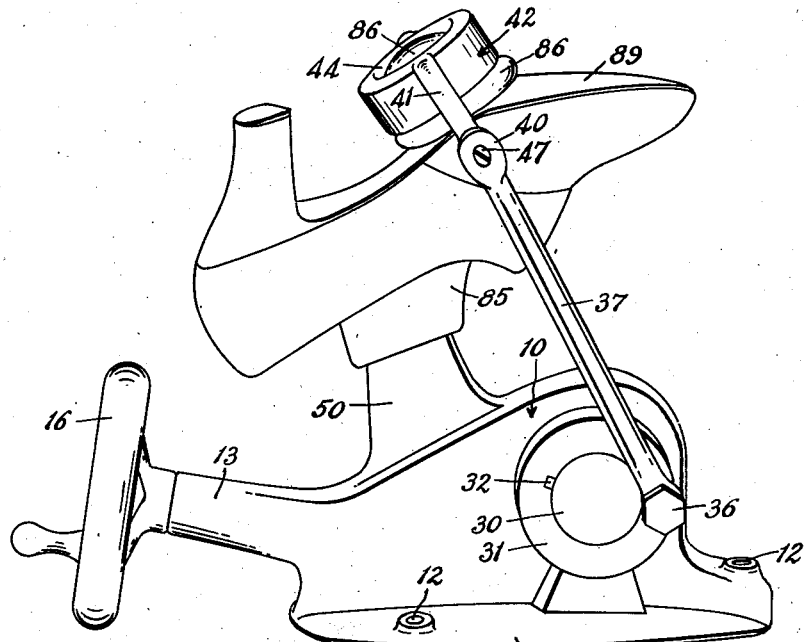

The shoe press disclosed in the drawings is adapted to apply pressure to various elements of a shoe by clamping those elements between opposed pressure members, one of which is preferably held stationary upon a tapered shank extending from a housing supporting and enclosing part of the drive mechanism for transmitting the desired pressure, and the other member being movable through the agency of the drive mechanism.

A frame or housing 10 is provided with a base 11 having a plurality of holes 12 therethrough to receive studs, bolts, or the like (not shown), to fasten the press to a suitable support. Housing 10 includes an integral sleeve 13 receiving a bushing 14 forming a bearing for a drive shaft 15 (Figures 2 and 4), to the outer end of which a hand wheel 16 or crank is fixed by a set screw 17. The shaft extends into the housing 10 with its inner end rotatably mounted within a bearing bracket 18 secured to the housing by one or more cap screws 19. Rigidly mounted on the drive shaft 15 is a worm 20 meshing with a worm gear 21 rotatably mounted in bearing openings 22 and 23 in the side walls of housing 10 (Figure 4). Axial thrusts on the drive shaft are resisted by collars 24 and 25 fixed on shaft 15 and bearing against respective wear washers 26 and 27 abutting bushing 14 and bracket 18.

Extending from opposite sides of worm gear 21 are trunnions 30, to each of which is secured an annulus 31 by a key 32 held in position within slots in the annulus 31 by a set screw 35. Each annulus threadedly receives a crank or wrist pin 36 passing through one end of a link, pitman, or connecting rod 37 embraced between the outer surface of annulus 31 and a head provided on crank pin 36.

Crank pins 36 are axially alined so that their associated connecting rods 37 are substantially parallel and lie in a common plane passed transversely through worm gear 21 and are operable together as a unit upon the movable pressure member. The upper ends of connecting rods 37 are provided with bifurcations 40 receiving arms 41 depending from opposite sides of a pressure member holder 42 forming a socket with a side wall 43 and a bottom 44. Each arm 41 is pivotally secured to an associated connecting rod by a pin 47 extending through the arm and threadedly secured to one of bifurcations 40.

A tapered shank 50 extending upwardly from housing 10 is adapted to be received by an internally tapered boss on an ordinary last or any other suitable stationary pressure member. The shoe is clamped between this member and a movable member associated with the driving mechanism, and preferably secured or received within holder 42. By turning hand wheel 16, the connecting rods 37 may be moved downwardly to effect a clamping action on the desired elements of a shoe. The shoe press heretofore described can be used in conjunction with interchangeable pressure members, which will now be described.

In Figures 1, 2, 3 and 4, shank 50 supports a tray having a bottom 56 and upstanding front, back and side walls 57. A cushion 60 of flexible material, preferably rubber, fits snugly within this tray, and comprises an upper wall 61 having depending back, front and side walls 62 contiguous the corresponding tray walls 57. The inner surfaces 63 of cushion walls 62 are inclined upwardly as at 64 to increase their bearing area upon the bottom of the tray. The cushion and tray form a hollow chamber 65. The cushion is free from pressure and, in an undeformed state, its top surface is substantially horizontal or slightly convex in transverse cross-section (see Figure 4). However, upon pressure being applied, as through a last and sole, the outsole will be forced into the upper surface of the cushion forming a depression therein, as shown in Figures 1, 2 and 3, and deforming the cushion into hollow 65. As a result, the outsole and shoe upper or welt are not acted upon by pressure exerted in a direction outwardly and away from the shoe, as in prior art arrangements, which tends to stretch the sole and deform the upper, but on the contrary, the reactive thrusts offered by the cushion walls are directed upwardly and inwardly of the edges of the shoe, being substantially normal to the margins of the outsole. The thrust is substantially uniform and continuous around the entire shoe portion to which pressure is being applied, its effectiveness being enhanced by the confining action of the tray upon the walls of the cushion. The normal resistance to deformation offered by the rubber may be increased by providing a confined air cushion between the sole cushion and the bottom of its confining tray. This may be accomplished by the provision of a thin flexible web extending across the sole cushion in advance of the forward joint between the shank 50 and the receiving boss on the tray, and engageable with the bottom of said tray. Still further resistance to deformation might be provided through the agency of a sponge rubber cushion insert, or the like, (not shown) between the top of the cushion and the tray bottom.

In Figures 1, 2 and 3 the movable pressure member consists of a sub-last 70 engaging with the insole or bottom portion 71 of a shoe upper. This sub-last has a universal joint pivot bearing 73—74 on a spike-last 72. An angular neck portion 76 extends upwardly from the base 75 of the spike-last, and carries a head 77 received and held within the holder 42 to which the connecting rods 37 are pivoted. The holder bottom 44 is provided with slots 78, (Figures 4, 6 and 7), permitting passage of a rib 79 depending from last head 77. Adjacent the rib, the head is provided with a plurality of recesses 80 adapted to receive the inturned flange 44 after the rib 79 has been inserted through slots 78 and the head 77 turned with respect to the holder 42, thereby forming a bayonet joint securely coupling the head and holder together.

The complete device shown in Figures 1 to 3, inclusive, is particularly adapted for cementing outsoles onto welts, insoles, or shoe uppers. Suitable cement may be applied to either or both the shoe elements. The shoe is placed upon the cushion 60 with the spike-last 72 and sub-last 70 in proper position within the shoe. Rotation of hand wheel 16 will move the sub-last 70 against the insole and clamp the outsole 82 to the welt or shoe upper according to the resistance offered by cushion 60. Upper wall 61 of the cushion is provided with a raised portion 61a at its rearward portion, which cooperates with the rearward portion of sub-last 70 to act upon the rear marginal edge of outsole 82 to insure a tight shank splice or joint which is practically unnoticeable. As previously described, the reactive thrusts are directed predominantly from the walls of the cushion inwardly toward the marginal edges of the outsole at about an angle of 45 degrees, producing the application of pressure uniformly around the edges and suitable adhesion between those elements of the shoe that are to be secured together. Uniform application of pressure is assured because of the self-adjusting and aligning of sub-last 70 with respect to spike-last 72, which action is permitted by the universal ball and socket joint 73—74 and by the pivotal connections 47 between connecting rods 37 and arms 41 on pressure member holder 42. The uniformity of pressure application and its proper direction is further assured by arranging crank pins 36, connecting rods 37, pivotal connections 47, and the ball and socket joint 73—74 so that they all lie in substantially the same general plane when the shoe is clamped in position in the press. This produces a pressure application substantially normal to the sole of the shoe by the sub-last, there being no thrust components tending to move the shoe or any of its elements laterally.

In the use of the press illustrated in Figures 6 to 9, inclusive, the movable press members are as described above but the tray, sole cushion, spike-last and sub-last have been removed, and an ordinary last 85 has been mounted upon shank 50 extending from housing 10. In place of the spike-last and sub-last, a flexible ball 86, preferably of rubber, is seated in the socket 43 of the holder. Through angular adjustment of connecting rods 37 and holder 42, and turning of hand wheel 16, this ball may be caused to cooperate with last 85 to exert pressure upon various portions of a shoe.

Figure 7 shows application of pressure to the heel 87 of a shoe 88. The ball, deformed by the pressure being applied, is engaged with the upper rear portion of the heel, clamping it securely against the heel seat. This type of operation is ideal for holding the shoe steady while nailing on top lifts.

Figure 8 shows application of pressure to the rear portion of a half sole 89. Pressure is applied uniformly to the skived, flush joint (not shown) between the rear of the half sole and the original sole, producing proper adhesion of these and associated shoe parts, it being understood that adhesive is previously applied to either or both of these shoe parts. Invisible sole jointing can be performed through this use of the press and the remainder of the half sole may be cemented or stitched to the insole, welt or upper.

Figure 9:
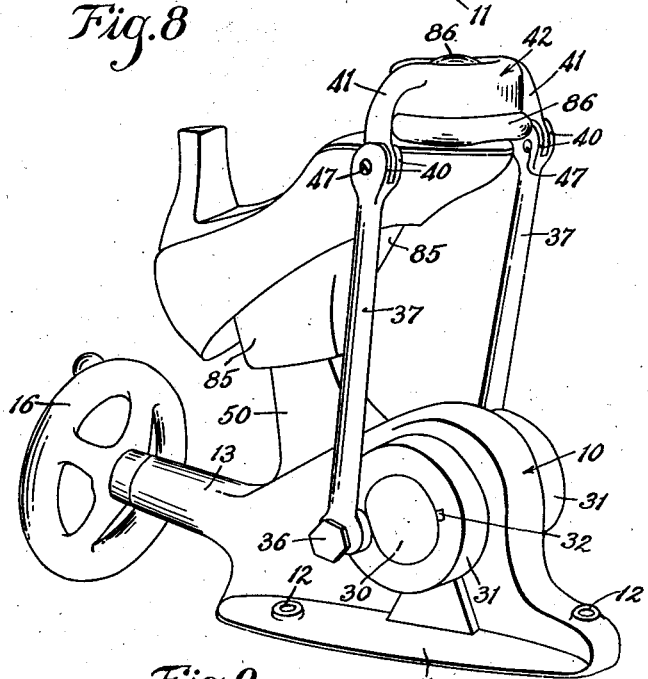

Figure 9 illustrates the press applying pressure to a toe piece or sole patch, ensuring its uniform adhesion to the other shoe parts through the application of properly directed pressure.

Figures 10 to 13, inclusive, disclose a further embodiment of the invention. In this form, a ring-shaped holder 90 is carried on frame shank 50 and mounts the last 91. The last is adjustably secured to the inner and outer surfaces 92 and 93 respectively of ring holder 90 by pivotally mounting the last arm 97 on a yoke 94 slidable on the ring holder. A screw 95 passes through last arm 97 and the yoke legs 96, 98, being threaded into the latter. The surfaces 99 and 100 are adapted to engage the opposing surfaces 92 and 93 of the ring-shaped holder 90. Thus, pivotal movement of last 91 with respect to yoke 94 will tighten the clamping elements on the ring holder. By moving the last and its associated clamp as a unit around the ring, the last can be caused to assume and be securely held in various angular positions with respect to the pressure applying ball of the press, the gripping action of the clamp being increased by increased thrust on the last.

Figure 10:
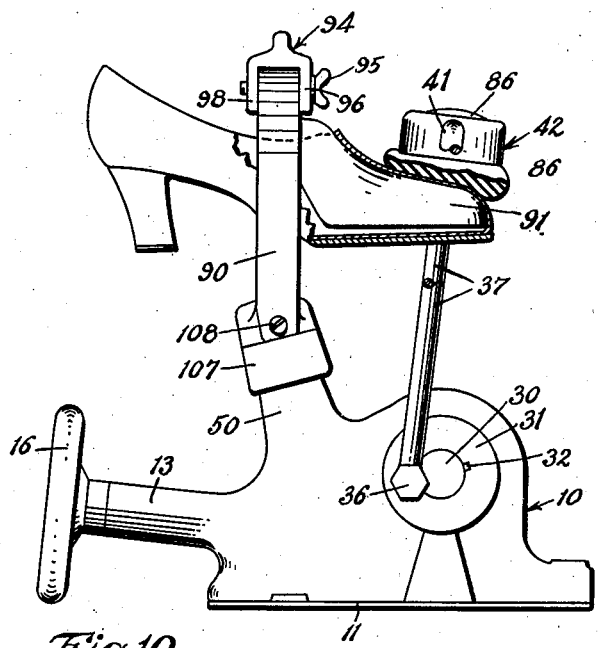
Figure 10 is a side elevation, with parts shown in section, of a modified form of last device that can constitute part of the press.
Figure 12:
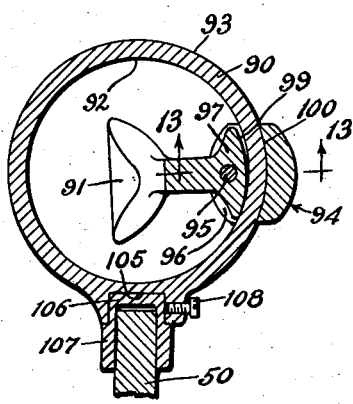
Figure 12 is a detail section taken on line 12—12 in Figure 11.
Figure 11:
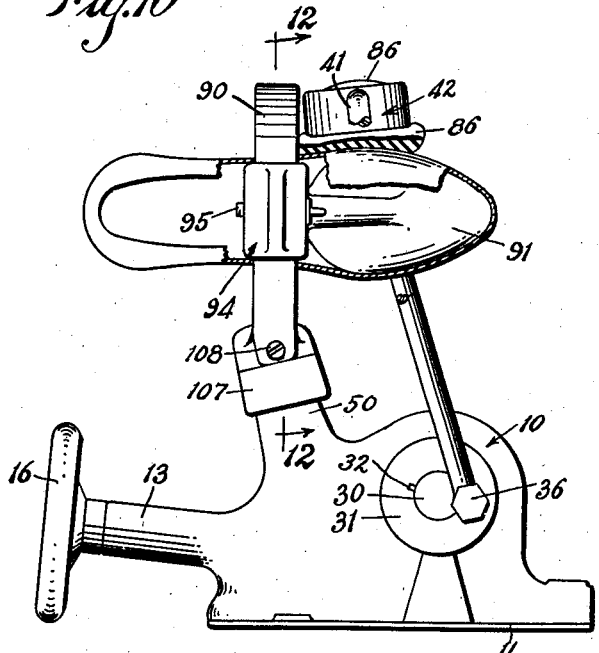
Figure 11 is a view, similar to Figure 10, showing the last in another position of operation.
Figure 13:
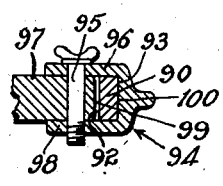
Figure 13 is a detail section taken on line 13—13 in Figure 12.

In Figure 10, the last and holder are operating on the toe of the shoe upper. In Figure 11, the last has been moved around the ring holder to provide pressure upon the vamp of the shoe. The last may be moved to other positions around the holder to provide pressure upon other selected parts of the shoe. Due to the arrangement of parts, the direction of pressure application is predominantly normal to the surface of the shoe part being operated upon, there being very little, if any, lateral thrust tending to cause distortion of the shoe parts or movement of the shoe on the last.

As a means of increasing the range of adjustability of the last with respect to the pressure ball, ring holder 90 may be rotatively mounted on shank 50. This is accomplished by providing a socket 105 in the lower portion of the holder to receive a boss 106 on a member 107 detachably mounted on shank 50. The holder may be turned about the axis of the boss 106 to adjust the last laterally with respect to member 42 and is held in adjusted position by the set screw 108 threaded through the ring and bearing against the boss.

Figure 14 illustrates another form of pressure device which might be used in pressure holder 42 instead of the flexible ball 86. This device includes a flexible housing 110 of rubber, or the like, having a pocket 111 containing a flexible ball 112 of sponge rubber or the like. The upper end of housing 110 is received in socket 43 of holder 42, its upper end abutting the bottom of the holder. An opening 115 communicating with the pocket 111 through the upper end of housing 110 permits insertion of ball 112. The combined flexible characteristics of the ball and housing seem to offer the required resistance to deformation when they are under operative pressure, but permit a proper yieldability of the housing to effect the desired pressure distribution on a shoe.

The structural details of the press as shown may be varied and parts substituted and additional operations performed without departing from the spirit of the invention and the exclusive use of such modifications coming within the scope of the claims is contemplated.

What is claimed is:

1. In a shoe press, cooperable pressure members, and means for moving one of said members with respect to the other member comprising rotatable driving mechanism and pivoted elements connecting said mechanism with said movable member and arranged to apply pressure through the latter from different directions when said mechanism is rotated in different directions.

2. In a shoe press, a pair of cooperable pressure members, one of said members comprising a last, driving means including an element rotatable about an axis, and linkage connecting said element and one of said pressure members to move said member toward said other pressure member and to apply thrust in different directions according to the rotation of said element.

3. In a shoe press, a last-like pressure member arranged to oppose an inner part of a shoe, a cooperating pressure member arranged to oppose the corresponding outer part of the shoe, a link pivotally connected with one of said members, and driving mechanism having a rotatable crank pivotally connected with said link and operable irrespective of the direction of rotation of said crank to move one of said members towards the other member.

4. In a shoe press, a last-like pressure member arranged to oppose an inner part of a shoe, a cooperating pressure member arranged to oppose the corresponding outer part of the shoe, a link having one end pivoted to one of said members, and driving mechanism comprising a crank pivotally connected to the other end of said link and operable when rotated in opposite directions to apply pressure at different angles to the other of said members.

5. In a shoe press, a last-like pressure member arranged to oppose an inner part of a shoe, a cooperating pressure member arranged to oppose the corresponding outer part of the shoe, a rotatable driving member, a rotatable driven member geared to said driving member, a crank pin on said driven member, and a connecting rod having its ends respectively pivoted to said crank pin and one of said pressure members.

6. In a shoe press, a last-like pressure member arranged to oppose an inner part of a shoe, a cooperating pressure member arranged to oppose the corresponding outer part of the shoe, a drive shaft, a worm on said shaft, a worm gear meshing with said worm, a crank pin rotatable with said worm gear, and a connecting rod having its ends respectively pivoted to said crank pin and one of said pressure members.

7. A shoe press including a housing having a shank extending therefrom, a stationary pressure member on said shank, a movable pressure means cooperable with said stationary pressure member to clamp shoe parts therebetween, a drive shaft, a worm on said shaft, a worm gear meshing with said worm, said shaft, worm and gear being enclosed in said housing, trunnions on said gear extending through said housing, crank pins on said trunnions, and connecting rods each pivoted to said movable pressure member and an associated crank pin.

8. In a shoe press, an annular support, a last, and grip means releasably securing said last in various angular positions on said support and comprising a clamp jaw adapted to engage the outer surface of said support and a cooperating element fixed to said last and pivotally connected to said jaw to engage the inner surface of said support.

9. In a shoe press, a stationary pressure member, a rotatable driving element and a driven element at one side of said member, and a movable pressure member pivotally connected to said driven element and adapted to swing over and oppose the opposite side of said stationary member and to apply pressure thereto in different directions according to the direction of rotation of said elements.

10. In a shoe press, cooperating pressure members adapted to clamp shoe parts therebetween, one of said members comprising a spike-last and a sub-last having universal joint bearing on each other to equally distribute pressure from one of said members against the other member in different directions in each of different planes passing through said bearing.

11. In a shoe press, a stationary pressure member and a movable pressure member adapted to clamp a shoe part therebetween, a driving element, a driven element having a crank pin, a link having one end connected to said pin and one end connected to said movable member, said movable member being adapted to deliver a thrust at an angle against said stationary member, the angle of thrust being governed by the direction of rotation of said driven element, and said driving and driven elements being constructed and arranged to positively hold said pressure members in a desired clamping arrangement.

12. In a shoe press, a stationary pressure member and a movable pressure member adapted to clamp a shoe part therebetween, a pair of links on opposite sides of said members, each link having one end pivotally connected to said movable pressure member, driving means, a rotatable driven element, and crank pins extending from opposite sides of said driven element, the other ends of said links being connected to said crank pins, whereby rotation of said driven element moves said links to transmit a thrust through said movable pressure member at an angle to the surface of said stationary pressure member determined by the direction of rotation of said driven element, and said driving and driven elements being constructed and arranged to positively hold said pressure members in a desired clamping arrangement.

13. In a shoe press, a frame, operating mechanism mounted thereon, a thrust transmitting pressure member actuated by said mechanism, an upright spindle on said frame, an element mounted on said spindle and having a horizontal axis, and a last carried by said element and adjustable by movement about the axis of said element to present different portions of a shoe thereon to said pressure member.

14. In a shoe press, a frame, operating mechanism mounted thereon, a thrust transmitting pressure member actuated by said mechanism, an upright spindle on said frame, an element mounted on said spindle and rotatable about the spindle axis, an upright annulus on said member, a clamping device slidably mounted on said annulus, and a last carried by said clamping device with its length disposed along the axis of said annulus, said device operating to grip said annulus when thrust is transmitted to said last by said pressure member irrespective of the angular position of said last and device in said annulus.

15. In a shoe press, a stationary pressure member, a movable pressure member opposing one side of said stationary member to clamp a shoe part therebetween, a driving element and a driven element on the opposite side of said stationary member, and a device pivotally connecting said driven element and said movable pressure member and arranged to be effectively shortened or elongated upon operation of said driving element but being otherwise unyielding, whereby the structure will accommodate variations in the thickness of the work between said elements or the application of the driven element to parts of the work at different points along its length, said driving element being constructed and arranged to maintain a positive thrust by said movable pressure member against the work irrespective of the position of the driving element or of variations in the thickness of the work or of the point of application of the movable pressure member to the work.

16. A shoe press as described in claim 15 in which the connecting device comprises a linkage arranged to extend alongside the work from the movable pressure member to the driven element.

17. A shoe press as described in claim 15 in which the connecting device comprises jointed links extending along opposite sides of the work between the movable pressure member and the driven element.

CULLEN L. HUNTOON.